United States Patent Office 3,145,144
Patented Aug. 18, 1964

3,145,144
PROCESS FOR MANUFACTURING CHROMIUM TREATED VACCINES
Koji Ando, 39 Kotakicho, Nakano-ku, Tokyo, Japan, assignor of one-half to Takeda Pharmaceutical Industries, Ltd., Osaka, Japan
No Drawing. Continuation of application Ser. No. 299,757, July 18, 1952. This application Sept. 28, 1960, Ser. No. 58,885
Claims priority, application, Japan, Aug. 9, 1951, 26/10,366
9 Claims. (Cl. 167—78)

The present application is a continuation of application Serial No. 299,757, filed July 18, 1952, now abandoned.

The invention relates to a process for manufacturing bacterial vaccines of high stability and very low toxicity by the treatment of aqueous suspensions of bacteria with a water soluble chromium salt, and to the new vaccines produced thereby.

An object of the invention is to manufacture new bacterial vaccines of good stability, low toxicity, and efficient immunizing action by the stabilization of antigen, especially the surface antigen, in bacteria, by treating living or dead bacteria with one or more of water soluble chromium compounds whereby the antigen, especially the surface antigen which functions as the immunizing antigen, is rendered stable in its action.

A further object of the invention is directed to a process for the treatment of pathogenic bacterial suspensions suitable as vaccines, the bacteria comprising *Bacillus typhosus, Bacillus paratyphosus* A, *Bacillus paratyphosus* B, *Salmonella abortus-equi, Vibrio cholerae,* dysentery bacilli, whooping cough bacillus, Brucella bacteria, *Pasteurella pestis, Bact. tularense, Mycobact. tuberculosis,* etc. with one or more of water soluble chromium salts for the purpose of stabilizing the immunizing antigen.

Other and further objects of the present invention will appear from the more detailed description set forth below, it being understood that such more detailed description is given by way of illustration and explanation only and not by way of limitation.

Bacterial vaccines have hitherto been manufactured by diluting to a suitable concentration a bacterial suspension after treating with formalin, Merthiolate (sodium ethylmercurithiasalicylate) or alcohol, or after subjecting to a heat-treatment in advance. Bacterial vaccines prepared by conventional methods described above have two drawbacks: deterioration of immunizing antigen during storage and reactions caused by toxic substances released from vaccine injected into human beings. The present invention is directed to the preparation of stable and low toxic bacterial vaccines by treating bacterial suspensions prepared so as not to destroy the bacterial antigen, with one or more of water soluble chromium salts to cause the antigen, especially the surface antigen, to combine with chromium. A suspension of bacteria is disinfected in the usual manner, destroying at the same time the autolytic enzyme, and thereafter treated with a water soluble chromium salt, such as chrome-alum (chromic potassium sulfate), chromic nitrate, chromium sulfate, chromic chloride, chromous chloride, potassium chromate, potassium bichromate, sodium chromate, sodium bichromate, etc., in order to form a film of the combination product of antigen and chromium over the surface of the bacteria. For disinfecting bacterial suspension, alcohol, formalin, Merthiolate, etc. were recommended by several investigators, such as A. Felix (Brit. Med. J., 1941, 1: 391), A. Felix and S. S. Bhatnagar (Brit. J. Exp. Path, 1935, 16, 422), J. K. Spitznagel and R. Y. Trainer (J. Immun., 1949, 62, 229), A. B. Wadsworth (Standards Methods 1947) etc. and the need of destroying autolytic enzyme for the preparation of vaccine was stressed by such investigators as O. T. Avery and G. E. Cullen (J. Exp. Med., 1923, 38: 199), H. B. Day (Brit. J. Exp. Path., 1928, 9: 198: J. Path. Bact., 1934, 38: 173), E. Wollman and E. Wollman (Ann. Inst. Past. 1936, 56: 1937), R. J. Dubos (J. Exp. Med., 1937, 65: 873), etc. Consequently there is no need of describing the details of this method.

In general to disinfect bacterial suspension and to destroy at the same time autolytic enzyme, but without destroying the important antigen, a suspension is treated with comparatively concentrated formalin or Merthiolate solution. In practice we have found that 1% by volume of commercial formalin or 0.02% of Methiolate for a bacterial suspension containing 50–100 mg. of bacilli per cc. yields a satisfactory suspension. The commercial formalin as used herein designates the usual 40% solution. According to the process of the present invention, a film of sparingly soluble substance is then formed over the bacterial body by the combination of the surface antigen and chromium, and the film prevents the antigen or endotoxin from dissolving out of the bacterial body into the solution. The toxicity of the vaccine decreases in proportion as the speed of dissolving out of the antigen or endotoxin is retarded. A suspension of bacteria not disinfected beforehand can be used instead of disinfected ones. In such case disinfectant and chrome solution are added at the same time to a living suspension, their concentrations being the same as in the case with disinfected suspension.

Chromium solution if used in a sufficient concentration, has sterilizing action. It, therefore, can be used without the addition of a disinfectant as is exemplified in Example 5–(2).

The combination of chromium with the antigen is effected best in a weak acid medium, especially at pH 4–6. However, when the medium is highly acid, it is necessary to weaken the acidity by the addition of a basic acid neutralizing agent, such as sodium thiosulfate, sodium carbonate, sodium bicarbonate, etc. When the medium is not sufficiently acid, as in the case of the use of small amounts of chromium sulfate or chromic chloride, it is desirable to increase acidity by adding mineral acid, such as sulfuric acid or HCl, or another inorganic or organic acid. When potassium chromate or bichromate is employed, the addition of alkali thiosulfate gives better results. The combination between chromium and antigen takes place in a neutral or alkaline medium, too, but the result in a neutral medium is not so good as that in an acid medium, and that in an alkaline medium is the worst. The concentration of chrome salt solution may vary depending on purposes. When a concentrated solution of a chromium compound is used, the combination between chromium or the chromium compound and antigen is tight, and the toxicity accordingly decreases remarkably. But the vaccine thus obtained, when injected, may produce a lasting induration or even pus formation at the site of injection. A balance between atoxicity and induration is maintained, the amount and concentration of the chrome salt varying according to the desired purposes. With chrome alum as an example, good results are obtained when a suspension containing 100 mg. of *Baccillus typhosus* per cc. is added with the same volume of 0.025–0.2% chrome alum solution. The antigen to be stabilized is chiefly surface antigen, but it is likely that part of the antigen inside bacteria is also stabilized since the chromium salt solution penetrates into the bacteria to a certain extent.

The foregoing chromium compounds are employed to provide the beneficial result in the so-treated vaccine. After action of the chromium compound the resulting bacterial cells are separated by centrifugation, and, the formalin and chromium compound which did not take part in the action are readily removed.

With typhoid bacillus, the toxicity on mice and rabbits of the product of the present invention is remarkably low, as compared with that of formalin treated vaccine and Merthiolate treated vaccine, the lethal dose of the vaccine according to the invention, on mice, being 50–200 mg. in contrast with 5–10 mg. of the latter. When administered by intravenous injection to rabbits, 0.1 mg. of formalin vaccine (e.g., B. typhosus) causes a remarkable leucopenia, whereas 10 mg. of the product of the present invention hardly shows such effect. In the protection test on mice and also in the production of protective antibody and Vi-antibody in rabbits both vaccines show almost the same effect if used in the same quantities, but the availability of a larger dose of the present product in the human body provides a distinct advantage for the formation of greater amounts of antibody. The process of the present invention can be applied to a large variety of bacteria generally used for the preparation of vaccine, for example, B. typhosus, B. paratyphosus A and B, V. cholerae, dysentery bacillus, whooping cough bacillus, S. abortus-equi, Brucella, Pasteurella pestis, Bact. tularense, Mycobact. tuberculosis, etc.

These chrome-treated vaccines are suitable not only for parenteral administration but also for oral use because they are stable against enzymes such as pepsin or trypsin.

The example of the invention and the results of the experimental test of these new vaccines on the animal and human body are briefly described below.

It is evident from the result below that these new vaccines manufactured by the method of the application, satisfy the requirement of clinical utility on animal and human beings.

EXAMPLE 1

TYPHOID VACCINE

The Vi-antigen is the essential immunizing antigen of typhoid bacilli. This antigen is measured by both agglutination and precipitation tests. The presence of intact Vi-antigen is shown by positive Vi-agglutination and negative O-agglutination (inhibition of O-agglutination by Vi-antigen).

(1) *Chromic potassium sulfate (chrome alum)*.—To a heavy saline suspension (100 mg. of bacilli per cc.) prepared from V phase typhoid bacillus cultured for 18 hours by agar culture was added 1% by volume of formalin. This suspension was mixed with the same volume of chrome alum solution of various concentrations (from 0.05 to 0.2%). The pH of supernatants of these mixtures was between 4 and 6. Each of the mixtures was thoroughly shaken and kept at 37° C. for 5 days. Bacilli collected by centrifuging were washed 3 times with physiological salt solution and then resuspended in the original volume of physiological salt solution containing 0.01% Merthiolate.

All suspensions prepared with the use of from 0.05 to 0.2% chrome alum solution showed equally positive Vi-agglutination and negative O-agglutination. This Vi-agglutinability remains almost unchanged after boiling for 30 minutes.

The toxicity for mice decreases with increase of the concentration of chrome alum, $LD_{50}$ being 20–100 mg., but even the toxicity of the most toxic one is far smaller than that of the formalin-vaccine, the best known vaccine (ca. 8 mg.). Dissolution of Vi-antigen into the supernatant by boiling is far less than that of formalin vaccine.

The highest dilution of supernatant of the chrome treated vaccine after boiling showing positive precipitation against anti-Vi serum was only 5–20 while that of the formalin treated vaccine was 640.

*Animal experiments.*—Heavy suspensions of chrome vaccine were prepared from 18 hour agar culture of B. typhosus, paratyphosus A and B with chrome alum solution (0.1% of chrome alum in the final concentration), as is described above.

Triple vaccine was prepared with these three vaccines and its potency was tested according to the American standard method. (Griffiths, J. J., Laboratory Method of Determining the Potency of Typhoid Vaccine. Public Health Reports, 1944, 59: 1515–1528). As is shown in Table 1, the potency of this vaccine is far beyond the minimum requirement. The minimum requirement requires that ⅔ of the immunized mice challenged with 1,000 lethal dose (LD) must survive while ⅔ of the control mice die.

The above sample of typhoid vaccine was compared with formol-vaccine in several animal experiments. Formol-vaccine was used as a control vaccine because formol is known to exert the least destructive action against Vi-antigen.

As is shown in Table 2, (1) toxicity of chrome vaccine for mice and rabbits is far less than that of the control vaccine, (2) the stability of Vi-antigen is far greater in the chrome vaccine than in the control vaccine, and (3) the antibody production in rabbits of both vaccines shows no difference between them, for the same amount.

*Antibody production in human volunteers.*—The above mentioned triple vaccine (chrome vaccine) was then compared with that prepared according to the Japanese standard method which is equivalent to the original American method in antibody production in human volunteers. Both vaccines contain the same amount of each bacillus as is described in Table 1. Each group comprising 33 and 36 human volunteers received 2 subcutaneous injections of 0.5 cc. of one of the two. The results are shown in Table 3. Reactions, chiefly fever, caused by the control vaccine were observed on the next day of injection whereas with chrome vaccine the fever was much less frequent. With the control vaccine local swelling and reddening were relatively rare and their duration was short, whereas they appeared 3–5 days after the injection of chrome vaccine and lasted for many days.

The production of antibody, especially of the Vi-antibody, the protective antibody, is more pronounced with chrome vaccine than with the control vaccine.

(2) *Chromium sulfate.*—To a heavy suspension (100 mg. per cc.) of 18 hours agar culture of V-phase typhoid bacillus was added an equal volume of 0.05% solution of chromium sulfate and the mixture was adjusted to pH 5 by the addition of sulfuric acid. Suspension prepared from this mixture in the same way as described in (1) showed positive Vi-agglutination and negative O-agglutination and this Vi-agglutinability remained unchanged after boiling for 30 minutes, dissolution of Vi-antigen into the supernatant being minimal.

80 mg. of this vaccine did not kill mice ($LD_{50}$ of formalin vaccine as control was found to be ca. 8 mg.) and all the mice immunized with $10^{-2}$–$10^{-5}$ mg. of this vaccine survived the intraperitoneal administration of both 0.05 mg. (about 3 lethal doses) of living bacilli and $10^{-5}$ mg. (many hundreds lethal doses) of bacilli suspended in 5% mucin.

(3) *Chromic chloride.*—To 10 cc. of a suspension of typhoid bacilli (100 mg. per cc.) containing 1% formalin were added 5 cc. of 0.2% $CrCl_3$ and 5 cc. of m/20 HCl (0.05% of $CrCl_3$ in the final concentration). The pH of the supernatant of this mixture was about 5.0. The washed bacilli were resuspended in 10 cc. of physiological salt solution containing 0.01% Merthiolate in a concentration of 100 mg. of bacilli per cc. This suspension was boiled 30 minutes in a water bath and the supernatant was separated from bacterial bodies of centrifuging. Bacterial bodies were resuspended in the original volume of physiological saline solution and a diluted suspension (1 mg. per cc.) was made therefrom. This suspension showed positive Vi- and negative O-agglutination when tested against a 1 in 100 dilution of anti-Vi and anti-O serum. The supernatant liquid of this boiled suspension reacted only up to 1:2.5 dilution, whereas the supernatant of boiled control vaccine (containing 100 mg. of formol killed baccili per cc.) up to a 1:640 dilution when their dilutions were tested against a 1 in 10 dilution of anti-Vi serum by the ring precipitation test. This shows a marked decrease in solubility of Vi antigen by treatment with chromium.

(4) *Chromic nitrate.*—To 10 cc. of a formolized suspension of typhoid bacilli (100 mg. per cc.) was added 5 cc. of 0.4% chromic nitrate solution and 5 cc. of m/10 $HNO_3$ (0.1% of $Cr(NO_3)_3$ in the final concentration. The pH of the supernatant of this mixture was found to be about 5.2. The washed bacilli were resuspended in physiological salt solution containing 0.01% Merthiolate in a concentration of 100 mg. of bacilli per cc. This suspension showed positive Vi- and negative O-agglutination even after boiling for 30 minutes according to the method described in (3). The supernatant of this boiled suspension reacted with a 1 in 10 dilution of anti-Vi serum only up to a 1 in 5 dilution, whereas the supernatant of boiled control suspension up to a 1 in 640 dilution.

EXAMPLE 2

PARATYPHOID A AND B VACCINE

The same method as used for *B. typhosus* in Example 1 is used for preparing chrome vaccine of paratyphoid A and B. One intravenous injection of 10 mg. of respective vaccine was found sufficient to produce in rabbits antiserum of such a titre as that reached by 4–5 consecutive intravenous injections of from 0.5 up to 5 mg. of control vaccine. This shows high antigenicity and low toxicity of these chrome vaccines.

EXAMPLE 3

DYSENTERY VACCINE

Although many methods of preparing dysentery vaccine have been proposed until recently, the products prepared by these methods have been considered as unsuitable for human use because of their high toxicity. The vaccine prepared according to the present method has been found to be almost atoxic while the immunizing power remains unaffected.

(1) *Chrome alum (chromic potassium sulfate).*—To 100 cc. of suspension of *Shig. flexneri 2b* (100 mg. per cc.) was added the same amount of 0.2% solution of chrome alum and this mixture was kept at 37° C. for 5 days. The pH of the supernatant of this mixture was 5.4 From this mixture was prepared a suspension containing 100 mg. of washed bacilli in the same way as described above. As is shown in Table 4, although the toxicity for mice, guinea pigs and rabbits is very much reduced as compared with heat-killed vaccine (5 mg. for mice and 20 mg for rabbits), its immunizing activity was found unaffected according to the results of protection test on mice, and, the antibody production in guinea pigs and rabbits remained unaffected. This result in rabbits is remarkable if compared with that obtained by the usual method of production of antidysentery serum which consists of 5–8 consecutive intravenous injections of small amounts (0.1 mg. up to 10 mg.). All these results show the low toxicity and high antigenicity of chromium treated vaccine.

*Immunization of human volunteers.*—9 persons were immunized with one intracutaneous injection of 0.5 mg. and 6 persons received 2 intracutaneous injections of the same amount of chrome vaccine. Neither local, nor systemic reactions were observed except slight reddening on the injected spot. As is shown in Table 5, antibody production was remarkable in both groups.

(2) *Chromic potassium sulfate* (Shig. dysenteriae, Shig. boydii, Shig. sonnei *and* Shig. dispar).—Chrome vaccines were prepared with the same method as described in (1) from fresh bacilli of these strains by using 0.2% chrome alum solution. $LD_{50}$ for mice of chrome vaccine of highly toxic shiga bacillus (*Shig. dysenteriae* 1) was found to be more than 40 mg. while that of ordinary heat killed or formol vaccine is only 1 mg. $LD_{50}$ for mice of chrome vaccine prepared with other strains was also more than 40 mg. Two intravenous injections of 10 mg. of these vaccines were found sufficient to provide a high-titre agglutinin (400–12,800X) in rabbits.

*Agglutinin production in rabbits.*—Suspensions of each group (A–D) were prepared by mixing suspensions of each type to make a suspension containing 10 mg. of bacilli of each type per cc. Suspension of group A, therefore, contains 70 mg. of bacilli per cc. in all, that of group B 80 mg., that of group C 70 mg. and that of group D 20 mg. per cc. Two intravenous injections of 1 cc. of these vaccines were found sufficient to produce antisera strongly reacting with antigens of all the types belonging to the group (400–25,600X), as is shown in Table 6. This result is remarkable compared with that obtained by the usual method which consists of producing antiserum for each type by 5–8 consecutive intravenous injections of small amounts (0.1 up to 10 mg.) of each vaccine and then mixing these antiserums.

The titre of agglutinin attained by chrome vaccine of Shiga bacillus could only be reached by 8 to 10 consecutive, at first subcutaneous and then intravenous injections of small amounts (from 0.1 mg. up to 10 mg.) of ordinary heat-killed or formol-killed vaccine. Chrome vaccine seems, therefore, to be highly suitable for the production of diagnostic group serums of dysentery bacilli.

(3) *Chromium sulfate* (Shig. flexneri 2b).—To a heavy suspension (100 mg. per cc.) of *Shig. flexneri 2b* containing 1% formalin was added the same volume of 0.1% solution of chromium sulfate and this mixture was adjusted to pH 5 by the addition of sulfuric acid. After having been kept at 37° C. for 5 days the bacilli were collected by centrifuging. Bacilli so collected, after washing with physiological salt solution, were resuspended in physiological salt solution containing 0.01% Merthiolate (100 mg. per cc.). 0.4 cc. (40 mg.) of this vaccine did not kill mice and 2 intravenous injections of 0.1 cc. (10 mg.) of this vaccine were sufficient to produce a high-titred agglutinin (12,800X) in rabbits.

(4) *Chromic chloride.*—The foregoing treatment for *Shig. flexneri 2b* was repeated with chromic chloride. To 100 cc. of bacterial suspension of *Shig. flexneri 2b* was added an equal volume of 0.2% solution of chromic chloride, the mixture having been adjusted to pH 5 by the addition of M/10 HCl. Agglutinin production in rabbits after two intravenous injections of 0.1 cc. (10 mg.) of this vaccine was almost the same as the above.

EXAMPLE 4

WHOOPING COUGH VACCINE

Bacilli were collected from 48 hour culture on Bordet-Gengou medium and suspended in physiological salt solution containing 0.02% of Merthiolate in a concentration of 100 mg. per cc. To 100 cc. of this suspension was added the same amount of 0.2% solution of chrome alum (chromic potassium sulfate) and this mixture, after shaking thoroughly, was kept at 37° C. for 5 days. The pH of the supernatant of this mixture was found 5.8. Heavy suspension (100 mg. per cc.) of this chrome vaccine was prepared in the same way as described above. This vaccine was compared with the vaccine prepared according to the Kendrick's (Wadsworth's Standard Methods, 1947, The Williams & Wilkins Company, Baltimore) and it was found that the vaccine fulfilled the requirement required by the standard methods of the Division of Laboratories of the New York State Department of Health. The test vaccine should approximate the control vaccine which, in an immunizing dosage of from 200 to 500 million bacilli, usually protects at least 50 percent of the mice against from 1000 to 5000 M.L.D. of culture. $ED_{50}$ (50% effective dose) of the control vaccine was found 140 million and that of the chromium treated vaccine 83 million, as is shown in Table 7.

As is shown in Table 7, (1) its lethal dose for mice, guinea pigs and rabbits is larger than that of the control vaccine, i.e., its toxicity is smaller than that of the control vaccine, (2) its antigenicity in mice (protection test according to the American Standard method) and its agglutinin production in rabbits is not less than that of the control vaccine, and (3) its antigenicity in mice is still kept tolerably after storage at 15–20° C. for 10 months while the control vaccine loses its antigenicity entirely during storage.

These results indicate the lower toxicity, equal antigenicity and greater stability of chromium treated vaccine in comparison with the vaccine in present use.

EXAMPLE 5

S. abortus-equi VACCINE

It is difficult to obtain clear cut results as regards antigenicity of S. abortus-equi vaccine by a mouse-test. Hamsters have recently been found to provide an accurate comparison for antigenicity tests of this vaccine. Chromium treated vaccine was compared with formol-vaccine according to this method.

(1) *Chromic potassium sulfate (chrome alum).*—A sample of chrome vaccine prepared with 0.2% solution of chrome alum by the same method as described in the section of typhoid vaccine was tested for its immunizing power in hamsters in comparison with a sample of phenol vaccine which has hitherto been considered as the best one of its kind.

As is shown in Table 8, 5 out of 12 hamsters received 2 intraperitoneal injections of 2 mg. of chrome vaccine survived the oral challenge with 0.25 mg. of living bacilli while all of those received the same injection of phenol vaccine and all of the control hamsters died within 23 and 14 days respectively.

Two out of the five surviving hamsters of the group of chrome vaccine showed neither decrease in body weight nor clinical symptoms such as urine incontinence, suppurative inflammation of eyes, immobility, diarrhoea, etc., instead increased their body weight during 30 days of observation, while the other 3 of this group recovered after showing some of these clinical symptoms.

A great difference in the days of survival of dead hamsters was also found among the three groups, as is shown in Table 8. The superiority of the chrome vaccine to the phenol vaccine is therefore without doubt.

(2) *Chromium sulfate.*—To a heavy suspension (200 mg. of bacilli per cc.) of S. abortus-equi was added the same volume of 0.1% solution of chromium sulfate and the mixture was adjusted to pH 5 by the addition of sulfuric acid. From this mixture was made a suspension (100 mg. per cc.) in the same way as described above. Two intravenous injections of 10 mg. of this vaccine were found sufficient to get a high-titred agglutinin in rabbits (1600–3200X).

*Table 1.—Potency Test of Typhoid Chrome Vaccine According to the American Standard Method*

[Griffiths, J. J.: Laboratory Method of Determining the Potency of Typhoid Vaccine, Public Health Reports, 1944, 59: 1515-1528]

[Intraperitoneal injection of 0.5 cc. of this vaccine diluted as to contain 1.1 mg. (0.7 mg. of B. typhosis, 0.2 mg. of each paratyphosis A and B) of organisms per cc. Intraperitoneal challenge with fresh suspension containing 5% mucin 10 days after the immunication.]

| Mice | Challenge dose | No. dead/total |
|---|---|---|
| Immunized | 100 LD | 0/10 |
|  | 1,000 LD | 0/10 |
|  | 10,000 LD | 0/10 |
| Not treated | 1 LD | 7/10 |

The minimum requirement requires that ⅔ of the immunized mice challenged with 1,000 lethal doses (LD) must survive while ⅔ of the control mice die.

*Table 2.—Typhoid Vaccine (Animal Experiments)*

|  | Chrome-vaccine | Control-vaccine |
|---|---|---|
| Toxicity: |  |  |
| Mouse (Lethal dose after intraperitoneal injection) | 100–200 mg. | 10 mg. |
| Leucopeny—after the injection: |  |  |
| Rabbit, 0.1 mg. | [1] | Very distinct. |
| 1.0 mg. | Slight | Do. |
| 10.0 mg. | do | [1]. |
| Stability of Vi-agglutinin: |  |  |
| Placed at 37° C. after the addition of Vi-destructive substance, e.g., 0.5% phenol or M/100 Na-citrate. | No change after 30 days Vi (+++) 0 (±). | Destruction is marked after 1 day Vi (±) 0 (+++). |
| Vi- and O-agglutination after boiling for 30 minutes. | Almost no change Vi (+++) 0(±). | Destruction of Vi is marked Vi(+) 0(++). |
| Antibody production in rabbits: |  |  |
| Protective antibody | >3,000 units [2] | >3,000 units. |
| Vi-agglutinin | 3,200–12,800X | 3,200–12,800X. |
| O-agglutinin | 3,200–12,800X | 3,200–12,800X. |

[1] Not tested. [2] Our arbitrary unit.

*Table 3.—Typhoid Vaccine (Human Immunization)*

GENERAL AND LOCAL REACTIONS AFTER THE INJECTION OF VACCINE

|  | Chrome-vaccine | Control-vaccine |
|---|---|---|
| Fever: |  |  |
| Next day | II | 24 |
| 7th day | I | 0 |
| Local induration: |  |  |
| Next day | I | 10 |
| 7th day | 16 | 0 |

AGGLUTININ PRODUCTION

|  | <5X | >10X | <5X | >10X |
|---|---|---|---|---|
| Vi-agglutinin: |  |  |  |  |
| Before | 26 | 7 | 30 | 6 |
| After 1 week | 15 | 18 | 23 | 13 |
| After 3 weeks | 10 | 23 | 25 | 11 |

|  | <10X | >20X | <10X | >20X |
|---|---|---|---|---|
| O-agglutinin: |  |  |  |  |
| Before | 21 | 12 | 25 | 11 |
| After 1 week | 8 | 25 | 14 | 22 |
| After 3 weeks | 7 | 26 | 14 | 22 |

*Table 4.—Toxicity and Antigenicity in Animals of Dysentery Chrome Vaccine*

| Toxicity: |  |
|---|---|
| Mice (intraperitoneal injection) | 80 mg. |
| Guinea pigs (intraperitoneal injection) | >320 mg. |
| Rabbits (intravenous injections) | >100 mg. |
| Protection test on mice (mucin method): [1] |  |
| $10^{-1}$ mg. | 1/10. |
| $10^{-2}$ mg. | 3/9. |
| $10^{-3}$ mg. | 5/10. |
| $10^{-4}$ mg. | 5/9. |
| Control | 10/10. |
| Guinea pigs: Agglutinin production after intraperitoneal injection of— |  |
| 40 mg. (3) | 800X, 1,600X, 3,200X. |
| 80 mg. (2) | 800X, 3,200X. |
| 160 mg. (2) | 800X, 160X. |
| Rabbits—Agglutinin production after intravenous injection of 10 mg. |  |
| After 1 week | 1,600X, 12,800X. |
| After 2 weeks | 1,600X, 6400X. |

[1] Immunization: Intraperitoneal injection of 0.2 cc. of dilutions of this vaccine.
Challenge: Intraperitoneal injection of 0.5 cc. of 5% mucin suspension containing 500 $LD_{50}$ 7 days after the immunization.

*Table 5.—Agglutinin Production in Human Volunteers Against Dysentery Chrome Vaccine*

| Agglutinin | 10X | 40X | 80X | 160X | 320X | 640X | Total |
|---|---|---|---|---|---|---|---|
| 1 injection (0.5 mg.): |  |  |  |  |  |  |  |
| Before | 1 | 4 | 2 | 2 |  |  |  |
| After 4 weeks |  |  |  | 7 | 2 |  | 9 |
| 2 injections (0.5 and 10 mg.): |  |  |  |  |  |  |  |
| Before |  | 1 | 3 | 1 | 1 |  |  |
| After 4 weeks |  |  |  | 2 | 2 | 2 | 6 |

Table 6.—Agglutinin Production in Rabbits with Dysentery Chrome-Vaccine

Shig. dysenteriae GROUP A

| Type | 1 | 2 | 3 | 4 | 5 | 6 | 7 |
|---|---|---|---|---|---|---|---|
| No. of rabbits: | | | | | | | |
| 86 | 800 | 200 | 800 | 1,600 | 400 | 400 | 800 |
| 87 | 800 | 400 | 800 | 1,600 | 1,600 | 1,600 | 1,600 |

Shig. flexneri GROUP B

| Type | 1a | 2a | 3 | 4a | 5 | 6 | X | Y |
|---|---|---|---|---|---|---|---|---|
| No. of rabbits: | | | | | | | | |
| 88 | 12,800 | 12,800 | 12,800 | 12,800 | 3,200 | 800 | 3,200 | 12,800 |
| 89 | 25,600 | 12,800 | 25,600 | 6,400 | 5,400 | 800 | 25,600 | 25,600 |

Shig. boydii GROUP C

| Type | 1 | 2 | 3 | 4 | 5 | 6 | 7 |
|---|---|---|---|---|---|---|---|
| No. of rabbits: | | | | | | | |
| 111 | 800 | 6,400 | 400 | 800 | 800 | 400 | 3,200 |
| 112 | 1,600 | 6,400 | 800 | 800 | 800 | 3,200 | 1,600 |

Shig. sonnei GROUP D

| Type | 1 | 2 | 3 | 4 | 5 | 6 | 7 |
|---|---|---|---|---|---|---|---|
| No. of rabbits: | | | | | | | |
| 90 | 400 | 1,600 | | | | | |
| 91 | 400 | 800 | | | | | |

Table 7.—Toxicity and Antigenicity of Whooping Cough Vaccine

TOXICITY (LETHAL DOSE)

| | Chrome vaccine | Control vaccine |
|---|---|---|
| Mice | 480 billion | 36 billion. |
| Guinea pigs | >800 billion | 200 billion. |
| Rabbits [1] | 0/5 [2] | 2/5. |

ANTIGENICITY

| | Chrome vaccine | Control vaccine |
|---|---|---|
| Mice ED$_{50}$ | 83 million | 140 million. |
| After 10 months at 15-200 | 330 million | >1,500 million. |
| Rabbits: Agglutinin titer after intravenous injection of 100 billions of organisms (all were 10 before injection). | 160<br>320<br>640<br>640<br>1,280 | 160.<br>640.<br>640. |

[1] Intravenous injection of 100 billion of bacilli.
[2] No. of death/No. tested.

Table 8.—Protection Test of S. abortus-equi Vaccine on Hamsters

| Group | Died/Tested | Days of survival of dead hamsters |
|---|---|---|
| Control | 12/12 | 11.5(8-14) |
| Phenol vaccine | 12/12 | 17(10-23) |
| Chrome vaccine | 7/12 | 22.3(13-33) |

EXAMPLE 6

A suspension in physiologic salt solution containing 100 mg. of *Bacillus typhosus* per cc. and 1% formalin was prepared from typhoid bacilli which had been cultured for 18 hours. The suspension was added with the same volume of 0.1% solution of chrome-alum added before-hand with sodium thiosulfate (0.1%) and, after shaking thoroughly, allowed to stand at 37° C. The pH of the supernatant of this mixture was about 5.8. After 5 days the bacilli were separated by centrifugation, washed three times with physiologic salt solution and then suspended in physiologic salt solution containing 0.01% of merthiolate to give a suspension containing 100 mg. of bacilli per cc. Two intraveneous injections of 0.1 cc. (10 mg.) of this suspension were found sufficient to produce a high-titred agglutinin (3,200–12,800X for both Vi and O) in three rabbits.

EXAMPLE 7

A suspension of Bordet-Gengou bacilli in physiologic salt solution containing 0.02% of merthiolate was prepared from the bacilli which had been cultured for 48 hours on Bordet-Gengou medium so that it contains 100 mg. of bacilli per cc. The suspension was added with the same volume of 0.05% solution of chrome-alum added beforehand with sodium thiosulfate (0.1%) and allowed to stand at 37° for 5 days. The pH of the supernatant of the mixture was about 6.0. The bacilli were collected by centrifugation, washed several times wih physiologic salt solution and finally suspended in physiologic salt solution containing 0.01% Merthiolate to give a suspension containing 100 mg. of bacilli per cc. The agglutinin titres attained by an intravenous injection of 1 cc. (100 mg.) of this vaccine to 3 rabbits were 320, 640 and 1280 on the fourteenth day after the injection.

EXAMPLE 8

A suspension of *Salmonella abortus-equi* in physiologic salt solution containing 100 mg. of bacilli per cc. and 1% formalin was added with the same volume of 0.1% solution of chrome-alum added beforehand with sodium thiosulfate (0.1%), and allowed to stand at 37° for 5 days. The pH of the supernatant of this mixture was about 5.6. The bacilli were separated, washed several times with physiologic salt solution and then suspended in physiological salt solution containing 0.01% Merthiolate to give a suspension containing 100 mg. of bacilli per cc. Six out of 9 hamsters receiving 2 intraveneous injections of 8 mg. and four out of 10 hamsters receiving 2 injections of 2 mg. of this vaccine survived the oral challenge with 0.25 mg. of living bacilli while all of 9 control hamesters died within 22 days. The oral challenge was made on the 21st day of the second immunication. This result shows the effectiveness of the chrome vaccine.

Having thus disclosed the invention what is claimed is:

1. A method for the preparation of stabilized bacterial vaccine which comprises subjecting a saline suspension of bacteria containing immunizing surface antigen to the action of a disinfectant selected from the group consisting of formalin and sodium ethylmercurithiosalicylate, admixing the disinfected suspension with aqueous solution containing 0.05 to 0.2% of a member selected from the group consisting of chrome alum, chromium sulfate, chromic chloride and chromic nitrate, maintaining the resulting admixture at a pH between 4 and 6 and at a temperature of about 37° C. for about 5 days, whereby the immunizing surface antigen is combined with chromium, thereafter centrifuging the resulting product and resuspending the so-collected bacteria in disinfectant-containing physiological salt solution.

2. A method for the preparation of stabilized *Bacillus typhosus* vaccine which comprises subjecting a saline suspension of *Bacillus typhosus* to the action of a disinfectant selected from the group consisting of formalin and sodium ethylmercurithiosalicylate, admixing the disinfected suspension with aqueous solution containing 0.05 to 0.2% of a member selected from the group consisting of chrome alum, chromium sulfate, chromic chloride and chromic nitrate, maintaining the pH at between 4 and 6, centrifuging the mixture after 5 days at 37° C., and resuspending the so-collected bacilli in disinfectant-containing physiological salt solution.

3. A method for the preparation of stabilized *Bacillus paratyphosus* vaccine which comprises subjecting a saline suspension of *Bacillus paratyphosus* to the action of a disinfectant selected from the group consisting of formalin and sodium ethylmercurithiosalicylate, admixing the disinfected suspension with aqueous solution containing 0.05 to 0.2% of a member selected from the group consisting of chrome alum, chromium sulfate, chromic chloride and chromic nitrate, maintaining the pH at between 4 and 6, centrifuging the mixture after 5 days at 37° C., and resuspending the so-collected bacilli in disinfectant-containing physiological salt solution.

4. A method for the preparation of stabilized dysentery bacilli vaccine which comprises subjecting a saline suspension of dysentery bacilli to the action of a disinfectant selected from the group consisting of formalin and sodium ethylmercurithiosalicylate, admixing the disinfected suspension with aqueous solution containing 0.05 to 0.2% of a member selected from the group consisting of chrome alum, chromium sulfate, chromic chloride and chromic nitrate, maintaining the pH at between 4 and 6, centrifuging the mixture after 5 days at 37° C., and resuspending the so-collected bacilli in disinfectant-containing physiological salt solution.

5. A method of the preparation of stabilized *Salmonella abortus-equi* vaccine which comprises subjecting a saline suspension of *Salmonella abortus-equi* to the action of a disinfectant selected from the group consisting of formalin sodium ethylmercurithiosalicylate, admixing the disinfected suspension with aqueous solution containing 0.05 to 0.2% of a member selected from the group consisting of chrome alum, chromium sulfate, chromic chloride and chromic nitrate, maintaining the pH at between 4 and 6, centrifuging the mixture after 5 days at 37° C., and resuspending the so-collected bacilli in disinfectant-containing physiological salt solution.

6. Stabilized *Bacillus typhosus* vaccine of low toxicity and high antigenicity obtained by the process according to claim 2.

7. Stabilized *Bacillus paratyphosus* vaccine of low toxicity and high antigenicity obtained by the process according to claim 3.

8. Stabilized dysentery bacilli vaccine of low toxicity and high antigenicity obtained by the process according to claim 4.

9. Stabilized *Salmonella abortus-equi* vaccine of low toxicity and high antigenicity obtained by the process according to claim 5.

References Cited in the file of this patent

Wright: J. Path Bact., vol 30, page 185, 1927.
Thompson et al.: Chem. Abs., 9143, 1938; POSL.
Collman: A Manual of Pharmacology, 6th Ed., 1942, p. 1095.
McCullough: "Disinfection and Sterilization," pp. 372–373, pub. 1945 by Lea and Febiger, Phila., Pa.
J.A.M.A., vol. 138, September to December 1948, p. 823; POSL.
Ando et al.: Japanese J. of Exp. Med., vol. 21, pp. 149–157, July 1951.
Nuefeld: Zeiltr. Bakteriol. Parasitenr., 114, 252, 1959.
Bensch et al.: Nature, February 14, 1959, pages 476–477.